United States Patent
Arima

(10) Patent No.: US 7,043,105 B2
(45) Date of Patent: May 9, 2006

(54) OPTICAL CIRCUIT ASSEMBLY AND SUBSTRATE ASSEMBLY

(75) Inventor: Tadao Arima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 10/273,090

(22) Filed: Oct. 18, 2002

(65) Prior Publication Data

US 2003/0198426 A1   Oct. 23, 2003

(30) Foreign Application Priority Data

Apr. 19, 2002   (JP)   ............................. 2002-117047

(51) Int. Cl.
*G02B 6/122* (2006.01)

(52) U.S. Cl. .......................................... 385/14; 385/89
(58) Field of Classification Search .................. 385/14, 385/39, 58, 70, 75, 89, 92
See application file for complete search history.

(56) References Cited

U.S. PATENT DOCUMENTS

| | | | | |
|---|---|---|---|---|
| 5,101,464 A | * | 3/1992 | Mousseaux et al. | 385/88 |
| 5,878,179 A | * | 3/1999 | Schricker | 385/100 |
| 5,898,812 A | * | 4/1999 | Vanoli | 385/135 |
| 6,163,639 A | * | 12/2000 | Ollier et al. | 385/52 |
| 6,360,048 B1 | * | 3/2002 | Yamada | 385/131 |
| 6,445,837 B1 | * | 9/2002 | Hanza | 385/14 |
| 6,457,877 B1 | * | 10/2002 | Kato et al. | 385/92 |
| 6,477,286 B1 | * | 11/2002 | Ouchi | 385/14 |
| 6,546,180 B1 | * | 4/2003 | Koyano et al. | 385/135 |

FOREIGN PATENT DOCUMENTS

| | | | |
|---|---|---|---|
| EP | 0816882 A2 | * | 7/1988 |
| JP | 09-311253 | | 12/1997 |
| JP | 2000-036632 | | 2/2000 |

* cited by examiner

*Primary Examiner*—Daniel Stcyr
(74) *Attorney, Agent, or Firm*—Staas & Halsey LLP

(57) ABSTRACT

An optical circuit assembly including a first substrate having a plurality of first recesses, a plurality of optical components mounted in the first recesses of the first substrate, respectively, a first cushion sheet attached to the first substrate and having a plurality of openings at positions respectively corresponding to the positions of the first recesses, and a plurality of optical fibers connected to the optical components and formed to be arranged on the first cushion sheet. The first recesses have shapes corresponding to the shapes of the optical components. The optical circuit assembly further includes a second substrate having a plurality of second recesses at positions respectively corresponding to the positions of the first recesses, and a second cushion sheet attached to the second substrate so as to cover the second recesses. The second recesses also have shapes corresponding to the shapes of the optical components. The second substrate is fixed to the first substrate by screws so that the first and second cushion sheets come into contact with each other.

16 Claims, 8 Drawing Sheets

OPTICAL CIRCUIT ASSEMBLY AND SUBSTRATE ASSEMBLY

BACKGROUND OF THE INVENTION

1. Field of the Invention

The present invention relates to an optical circuit assembly having a substrate and a plurality of optical components mounted on the substrate, and also to a substrate assembly suitable for use in the optical circuit assembly.

2. Description of the Related Art

In an optical communication system, an optical amplifier module is used which can amplify an optical signal without conversion to an electrical signal for extension of a repeater spacing. In a conventional optical amplifier module, various optical components are mounted on a metal base of aluminum or the like having high heat dissipatability, and fixed to the metal base by means of screws. Optical fibers connected to the optical components are spliced, and thereafter formed to be adjusted so that each spliced portion comes to a given fixing position. In this condition, each spliced portion is fixed to the metal base by means of a fixture. Each optical fiber is also fixed to the metal base at several positions.

Particularly in an optical amplifier for wavelength division multiplex (WDM), the number of optical components and the number of optical fibers are large, so that a sufficient mounting space cannot be ensured. Accordingly, the optical fibers are wired and formed by utilizing spaces among the optical components and the fixtures. As a result, the forming operation for the optical fibers is hindered by the fixtures. Furthermore, the forming operation becomes complicated because of the adjustment for setting the spliced portions at the given fixing positions where the fixtures are mounted. As a result, the productivity of the optical amplifier is remarkably reduced. In addition, since a space for fixing each optical component by means of screws must be ensured, the forming space for the optical fibers becomes very narrow.

SUMMARY OF THE INVENTION

It is therefore an object of the present invention to provide an optical circuit assembly which can greatly improve the workability to fixing of optical components and the workability to forming of optical fibers.

It is another object of the present invention to provide a substrate assembly suitable for use in the optical circuit assembly.

In accordance with an aspect of the present invention, there is provided an optical circuit assembly including a first substrate having a plurality of first recesses; a plurality of optical components mounted in the first recesses of the first substrate, respectively; a first cushion sheet provided on the first substrate, the first cushion sheet having a plurality of openings at positions respectively corresponding to the positions of the first recesses; a plurality of optical fibers connected to the optical components and arranged on the first cushion sheet; a second substrate having a plurality of second recesses at positions respectively corresponding to the positions of the first recesses; a second cushion sheet provided on the second substrate so as to cover the second recesses; and means for fixing the second substrate to the first substrate so that the first and second cushion sheets come into contact with each other.

Preferably, the first substrate has printed wiring patterns along which the optical fibers are formed. Preferably, a tack coating is formed on the upper surface of the first cushion sheet where the optical fibers are arranged, or the first cushion sheet itself is formed of a material having tackiness. Preferably, the first substrate has a plurality of stress adjusting projections. Preferably, each of the first recesses of the first substrate has a depth enough to fully receive each of the optical components, and the first substrate has a plurality of guide grooves for guiding the optical fibers to the upper surface of the first cushion sheet with a given radius of curvature or more.

In accordance with another aspect of the present invention, there is provided a substrate including a plurality of recesses having shapes respectively corresponding to the shapes of optical components to be mounted; and printed wiring patterns along which optical fibers are to be formed.

In accordance with a further aspect of the present invention, there is provided a substrate assembly including a substrate having a plurality of recesses having shapes respectively corresponding to the shapes of optical components to be mounted, and printed wiring patterns along which optical fibers are to be formed; and a transparent cushion sheet attached to the upper surface of the substrate, the cushion sheet having a plurality of openings at positions respectively corresponding to the positions of said recesses. Preferably, a tack coating is formed on the upper surface of said cushion sheet, and a plurality of projections are fixed to the upper surface of said substrate.

In accordance with a still further aspect of the present invention, there is provided an optical amplifier module including a radiating plate; a pumping laser diode mounted on the radiating plate; an Er doped optical fiber module mounted on the radiating plate and connected to the pumping laser diode, the Er doped optical fiber module having a reel and an Er doped optical fiber wound around the reel; and an optical circuit assembly mounted on the radiating plate and connected to the Er doped optical fiber module; the optical circuit assembly including a first substrate having a plurality of first recesses; a plurality of optical components mounted in the first recesses of the first substrate, respectively; a first cushion sheet provided on the first substrate, the first cushion sheet having a plurality of openings at positions respectively corresponding to the positions of the first recesses; a plurality of optical fibers connected to the optical components and arranged on the first cushion sheet; a second substrate having a plurality of second recesses at positions respectively corresponding to the positions of the first recesses; a second cushion sheet provided on the second substrate so as to cover the second recesses; and means for fixing the second substrate to the first substrate so that the first and second cushion sheets come into contact with each other.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
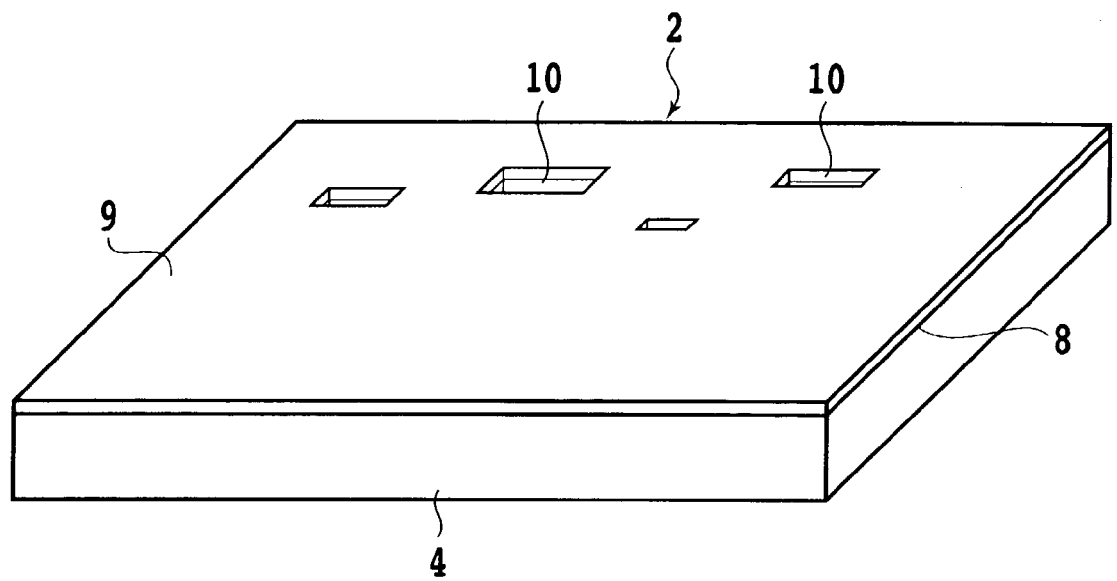
FIG. 1 is a perspective view of a lower substrate assembly as a first preferred embodiment of the substrate assembly according to the present invention.
Figure 2:
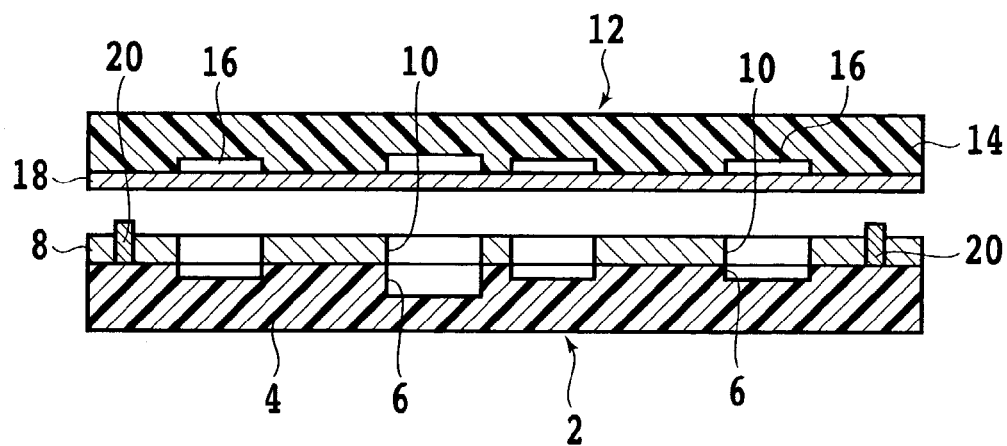
FIG. 2 is a sectional view of the lower substrate assembly shown in FIG. 1 and an upper substrate assembly adapted to be fixed to the lower substrate assembly.

Referring to FIG. 1, there is shown a perspective view of a lower substrate assembly 2 as a first preferred embodiment of the substrate assembly according to the present invention. FIG. 2 shows a sectional view of the lower substrate assembly 2 and an upper substrate assembly 12 adapted to be fixed to the lower substrate assembly 2. As shown in FIG. 2, the lower substrate assembly 2 includes a lower substrate 4 and a cushion sheet 8 attached to the upper surface of the lower substrate 4. The lower substrate 4 has a plurality of recesses 6 having shapes respectively corresponding to the shapes of various optical components so that the optical components are adapted to be mounted in the recesses 6. The lower substrate 4 is formed by resin molding. The cushion sheet 8 has a plurality of openings (cutouts) 10 at positions respectively corresponding to the positions of the recesses 6 of the lower substrate 4. A tack coating 9 of rubber elastomer, rosin, etc. is formed on the upper surface of the cushion sheet 8. Alternatively, the cushion sheet 8 itself may be formed of a material having tackiness rather than forming the tack coating 9 on the cushion sheet 8. The cushion sheet 8 is formed of transparent soft silicone rubber, for example, in this preferred embodiment.

The upper substrate assembly 12 includes an upper substrate 14 and a cushion sheet 18 attached to the lower surface of the upper substrate 14. The upper substrate 14 has a plurality of recesses 16 having shapes respectively corresponding to the shapes of the optical components at positions corresponding to the positions of the recesses 6 of the lower substrate 4 so that the optical components mounted in the recesses 6 of the lower substrate 4 are received at their upper portions in the recesses 16 of the upper substrate 14. The upper substrate 14 is also formed by resin molding. Unlike the cushion sheet 8 attached to the lower substrate 4, the cushion sheet 18 has no openings, so that it covers the recesses 16 of the upper substrate 14 in the attached condition. The cushion sheet 18 is also formed of transparent soft silicone rubber, for example. Each of the cushion sheets 8 and 18 has a thickness of about 1.5 mm. When the upper substrate assembly 12 is fixed to the lower substrate assembly 2, the cushion sheets 8 and 18 are contracted to strongly press splice protective sleeves (which will be hereinafter described) each having a diameter of about 2 mm and to weakly press thin optical fibers (which will be hereinafter described).

Figure 3:
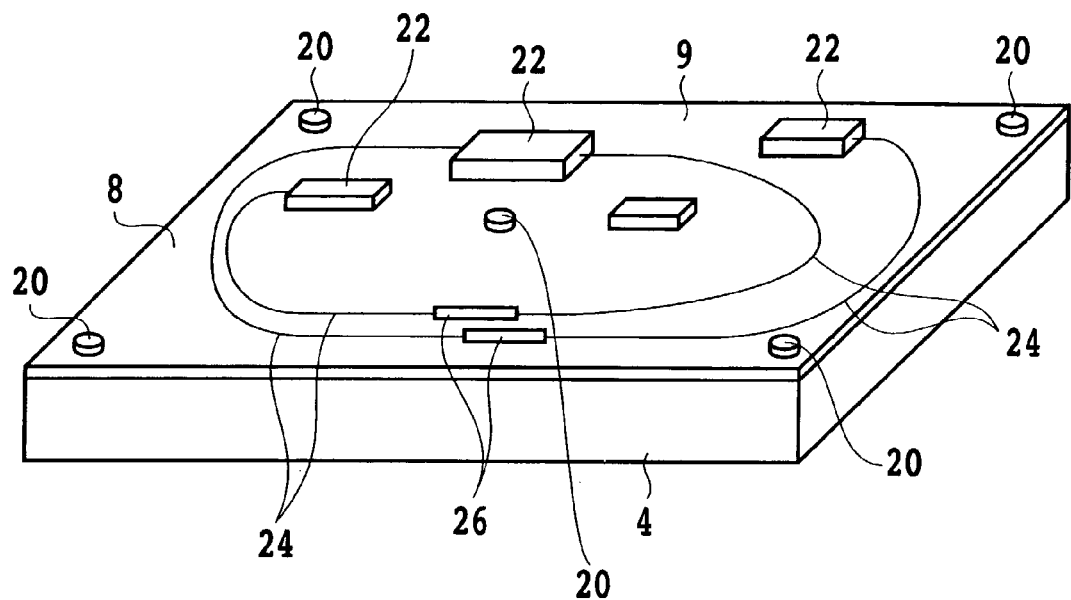
FIG. 3 is a perspective view showing a condition where optical components and optical fibers are mounted on the lower substrate assembly shown in FIG. 1.

FIG. 3 shows a condition where optical components 22 and optical fibers 24 are mounted on the lower substrate assembly 2. That is, the optical components 22 are mounted in the recesses 6 of the lower substrate 4 so as to project from the openings 10 of the cushion sheet 8. The optical fibers 24 are connected to the optical components 22 and formed on the upper surface of the cushion sheet 8. The optical fibers 24 thus formed are temporarily fixed on the upper surface of the cushion sheet 8 by the tack coating 9. Preferably, an optical fiber mounting chart and an optical component mounting chart are printed on the upper surface of the lower substrate 4. The optical fiber mounting chart is configured by differently coloring a plurality of wiring patterns for the optical fibers 24. The optical fibers 24 are formed in accordance with this optical fiber mounting chart and placed on the upper surface of the cushion sheet 8. Reference numerals 26 denote splice protective sleeves. Further, a plurality of stress adjusting projections 20 are provided on the upper surface of the lower substrate 4 at its four corners and central portion.

Figure 4:
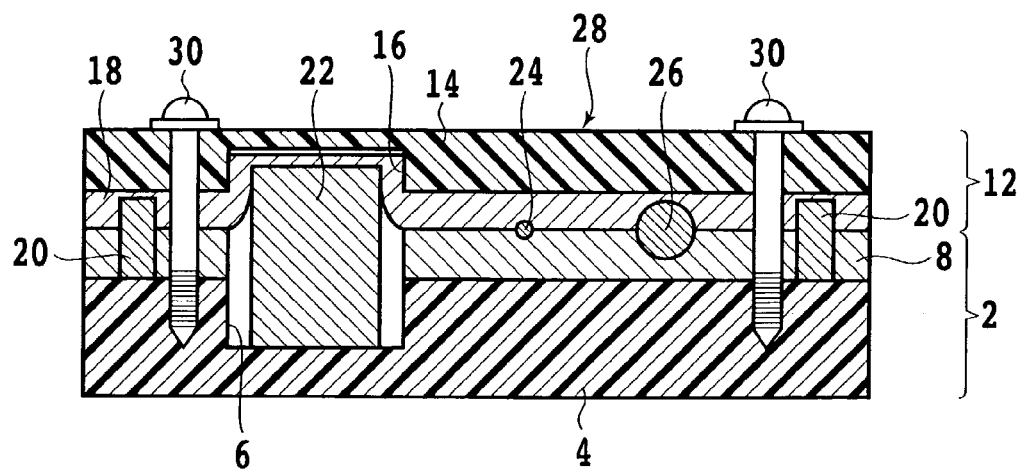
FIG. 4 is a sectional view of an optical circuit assembly as a first preferred embodiment of the optical circuit assembly according to the present invention.

FIG. 4 shows a sectional view of an optical circuit assembly 28 as a first preferred embodiment of the optical circuit assembly according to the present invention. The optical circuit assembly 28 includes the lower substrate assembly 2 shown in FIG. 2, the upper substrate assembly 12 shown in FIG. 2, the optical components 22 mounted on the lower substrate assembly 2, and the optical fibers 24 mounted on the lower substrate assembly 2. The depth of each recess 6 formed on the lower substrate 4 is adjusted so that the optical fibers 24 connected to the optical components 22 are at the same level as that of the upper surface of the cushion sheet 8. Accordingly, the forming of the optical fibers 24 can be performed on the same surface, thereby eliminating the need for adjustment of bends of the optical fibers 24 due to steps. The optical components 22 are inserted in the recesses 6 and positioned therein, and the optical fibers 24 are formed in accordance with the optical fiber mounting chart printed on the upper surface of the lower substrate 4. Further, the optical fibers 24 are spliced at given positions, and the spliced portions of the optical fibers 24 are protected by the splice protective sleeves 26. The splice protective sleeves 26 are placed on the upper surface of the cushion sheet 8.

Since the upper surface of the cushion sheet 8 has tackiness, the optical fibers 24 can be always maintained in a temporarily fixed condition on the upper surface of the cushion sheet 8, thereby preventing disorder of the optical fibers 24 during the forming operation. The upper substrate 14 is laid on the lower substrate 4 so that the cushion sheet 18 comes into contact with the cushion sheet 8 and that the recesses 16 of the upper substrate 14 are fitted with the optical components 22 mounted in the recesses 6 of the lower substrate 4. Thereafter, the upper substrate 14 is fixed to the lower substrate 4 by means of screws 30. Since the stress adjusting projections 20 are provided on the upper surface of the lower substrate 4 at its four corners and central portion, the spacing between the lower substrate 4 and the upper substrate 14 can be uniformed to thereby control the stress against the optical fibers 24. In the fixed condition of the lower substrate 4 and the upper substrate 14, the cushion sheets 8 and 18 are contracted to thereby strongly press the splice protective sleeves 26 each having a diameter of about 2 mm and to weakly press the thin optical fibers 24 each having a smaller diameter. The optical components 22 are forced into the recesses 16 of the upper substrate 14 through the cushion sheet 18, thereby compensating for dimensional errors to ensure always stable fixation.

Figure 5:
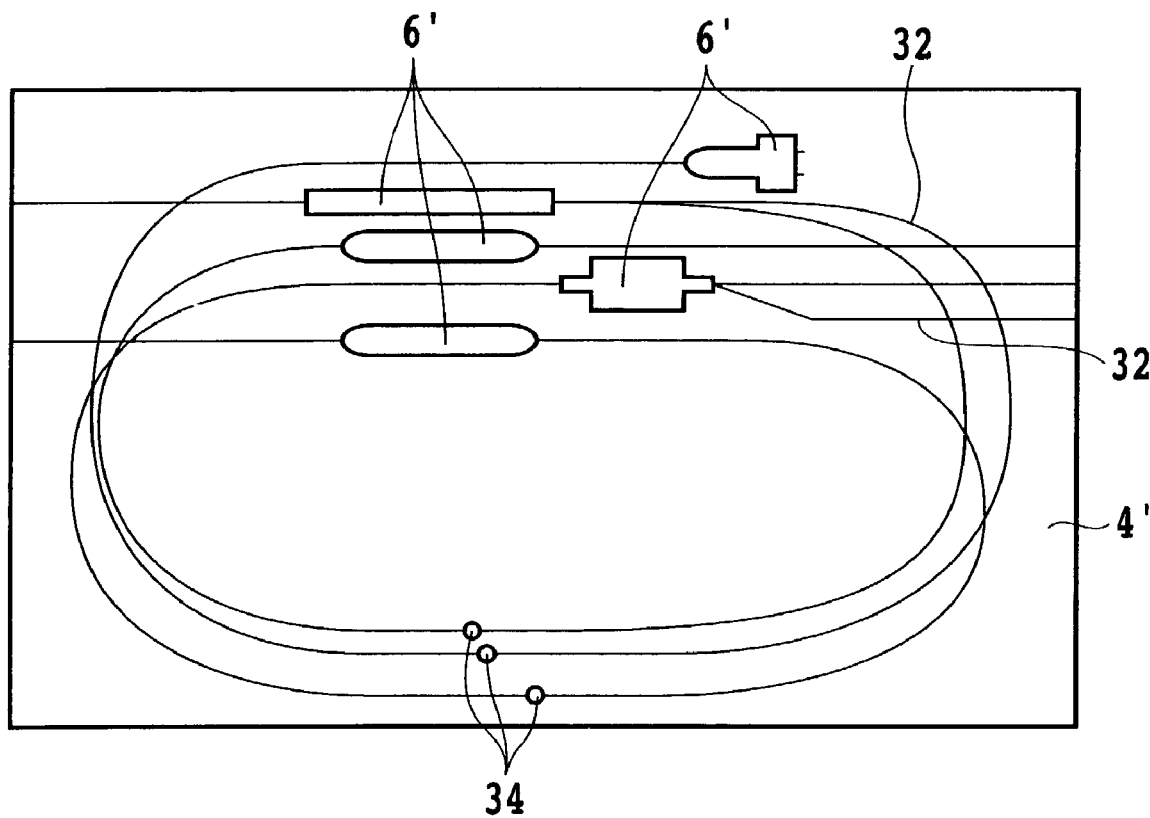
FIG. 5 is a plan view of a lower substrate having optical fiber wiring patterns.
Figure 6:
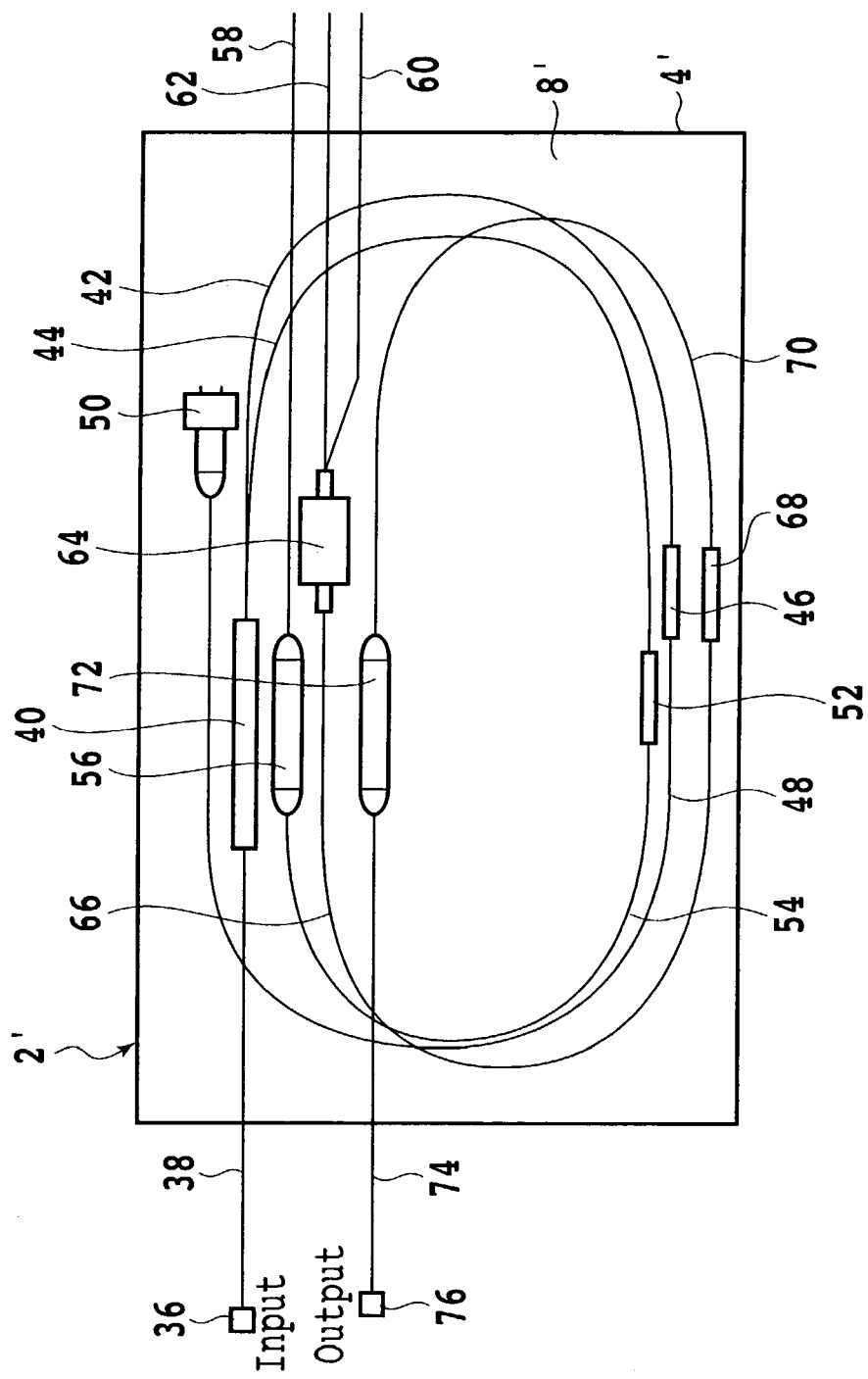
FIG. 6 is a plan view showing a condition where optical components and optical fibers are mounted on a lower substrate assembly as a second preferred embodiment of the substrate assembly according to the present invention.

FIG. 5 shows a plan view of a lower substrate 4' as another preferred embodiment of the substrate according to the present invention. A plurality of optical fiber wiring patterns 32 are printed on the upper surface of the lower substrate 4', and a plurality of recesses 6' for mounting various types of optical components are formed on the upper surface of the lower substrate 4'. The recesses 6' are different in shape according to the different shapes of the optical components. Reference numerals 34 denote splice symbols for indicating the splice positions for optical fibers to be spliced. The optical fiber wiring patterns 32 are printed in different colors. FIG. 6 shows a condition where the optical components and the optical fibers are mounted on a lower substrate assembly 2' as a second preferred embodiment of the substrate assembly according to the present invention. The lower substrate assembly 2' includes the lower substrate 4' shown in FIG. 5 and a cushion sheet 8' attached to the upper surface of the lower substrate 4'. The cushion sheet 8' has a plurality of openings respectively corresponding to the recesses 6' of the lower substrate 4'.

As shown in FIG. 6, an optical signal input from an optical connector 36 on the input side propagates along an optical fiber 38 and is divided into two beams by a beam splitter 40. One of the two beams propagates along optical fibers 42 and 48 and is detected by a photodiode 50. The optical fibers 42 and 48 are spliced with each other and a spliced portion thereof is protected by a protective sleeve 46. The other beam from the beam splitter 40 propagates along optical fibers 44 and 54 to enter an optical isolator 56, and further propagates along an optical fiber 58 to enter an Er doped optical fiber (not shown). The optical fibers 44 and 54 are spliced with each other and a spliced portion thereof is protected by a protective sleeve 52.

An optical fiber 60 is connected at one end thereof to a multiplexer/demultiplexer 64. The other end of the optical fiber 60 is connected to a pumping laser diode (not shown). An optical fiber 62 is also connected at one end thereof to the multiplexer/demultiplexer 64. The other end of the optical fiber 62 is connected to an Er doped optical fiber (not shown). Accordingly, an optical signal propagating along this Er doped optical fiber from the right to the left as viewed in FIG. 6 is amplified by forward pumping. The optical signal thus amplified propagates along optical fibers 66 and 70 to enter an optical isolator 72, and further propagates along an optical fiber 74 to emerge from an optical connector 76 on the output side. The optical fibers 66 and 70 are spliced with each other, and a spliced portion thereof is protected by a protective sleeve 68.

Figure 7A:
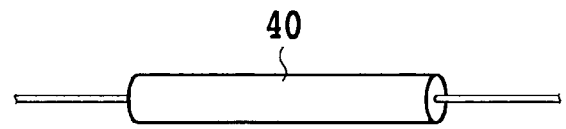
FIGS. 7A to 7D are perspective views of the optical components shown in FIG. 6.
Figure 7B:
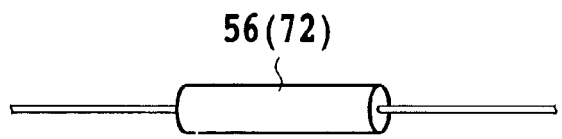
Figure 7C:
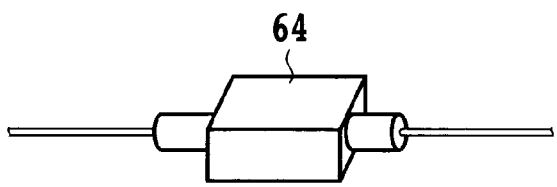
Figure 7D:
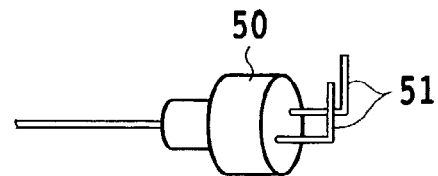

FIGS. 7A to 7D show examples of the shapes of the optical components mounted on the lower substrate assembly 2' shown in FIG. 6. FIG. 7A shows the beam splitter 40 having a cylindrical shape, FIG. 7B shows the optical isolator 56 or 72 having a cylindrical shape, FIG. 7C shows the multiplexer/demultiplexer 64, and FIG. 7D shows the photodiode 50 having terminals 51.

Figure 8:
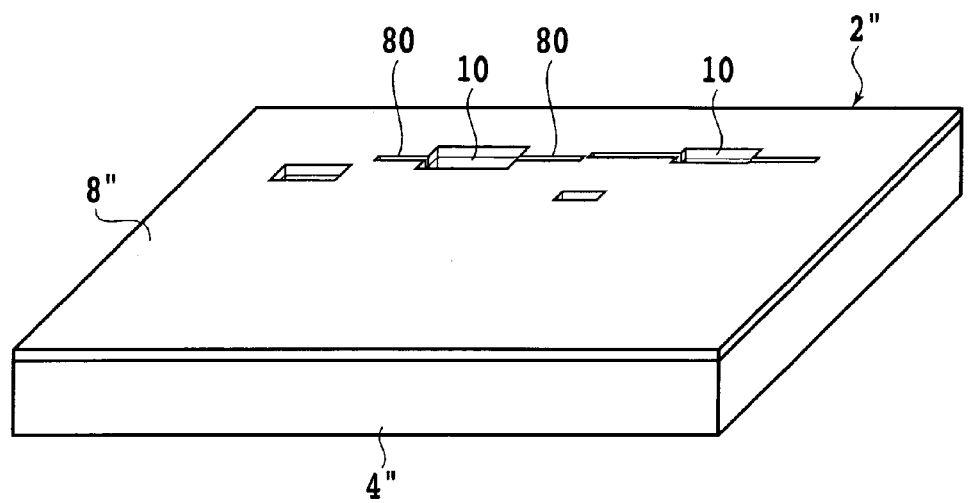
FIG. 8 is a perspective view of a lower substrate assembly as a third preferred embodiment of the substrate assembly according to the present invention.
Figure 9:
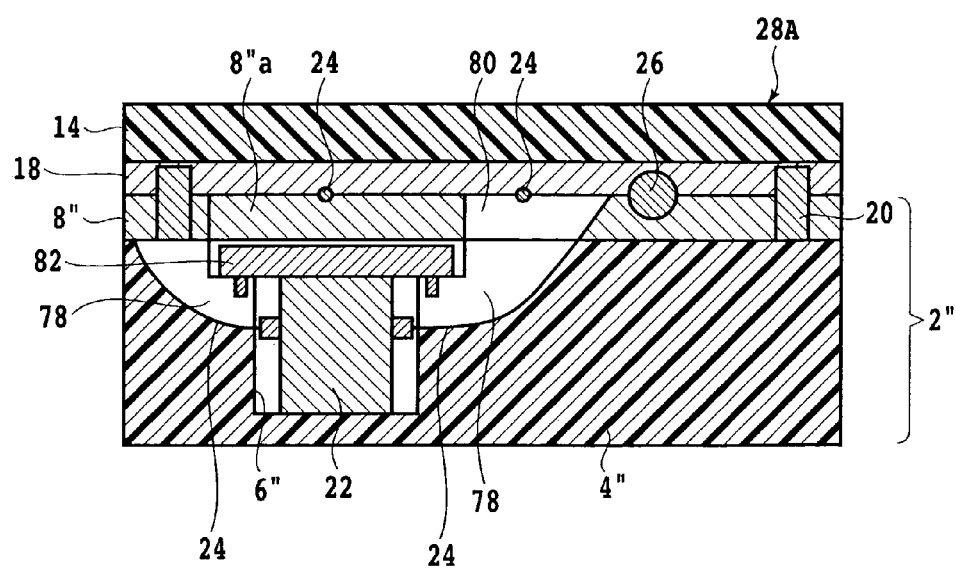
FIG. 9 is a sectional view of an optical circuit assembly as a second preferred embodiment of the optical circuit assembly according to the present invention.

FIG. 8 shows a perspective view of a lower substrate assembly 2" as a third preferred embodiment of the substrate assembly according to the present invention. FIG. 9 shows a sectional view of an optical circuit assembly 28A as a second preferred embodiment of the optical circuit assembly according to the present invention. The optical circuit assembly 28A includes the lower substrate assembly 2". The lower substrate assembly 2" includes a lower substrate 4" and a cushion sheet 8" attached to the upper surface of the lower substrate 4". The lower substrate 4" has a plurality of recesses 6" each having a depth set so that each optical component 22 is fully received in the corresponding recess 6". Further, the lower substrate 4" has a plurality of guide grooves 78 each having a depth gradually changed so that the optical fiber 24 extending from each optical component 22 is smoothly guided to the upper surface of the cushion sheet 8" with a radius of curvature of 30 mm or more. The cushion sheet 8" has a plurality of openings 10 respectively corresponding to the recesses 6" of the lower substrate 4" and a plurality of slits 80 respectively corresponding to the guide grooves 78 of the lower substrate 4".

After each optical component 22 is mounted in the corresponding recess 6" of the lower substrate 4", the optical component 22 is fixed by a pressure member 82, and a cut cushion sheet 8"a is attached to the upper surface of the pressure member 82. In this condition, the upper surface of the cushion sheet 8" inclusive of the cut cushion sheet 8"a becomes flat with no projections except the stress adjusting projections 20. Accordingly, the space for forming of the optical fibers 24 can be enlarged to improve the workability. Finally, the upper substrate 14 is fixed to the lower substrate 4" by means of screws or the like in such a manner that the cushion sheet 18 attached to the upper substrate 14 comes into contact with the cushion sheet 8" attached to the lower substrate 4", thereby strongly pressing the protective sleeves 26 and weakly pressing the optical fibers 24.

Figure 10:
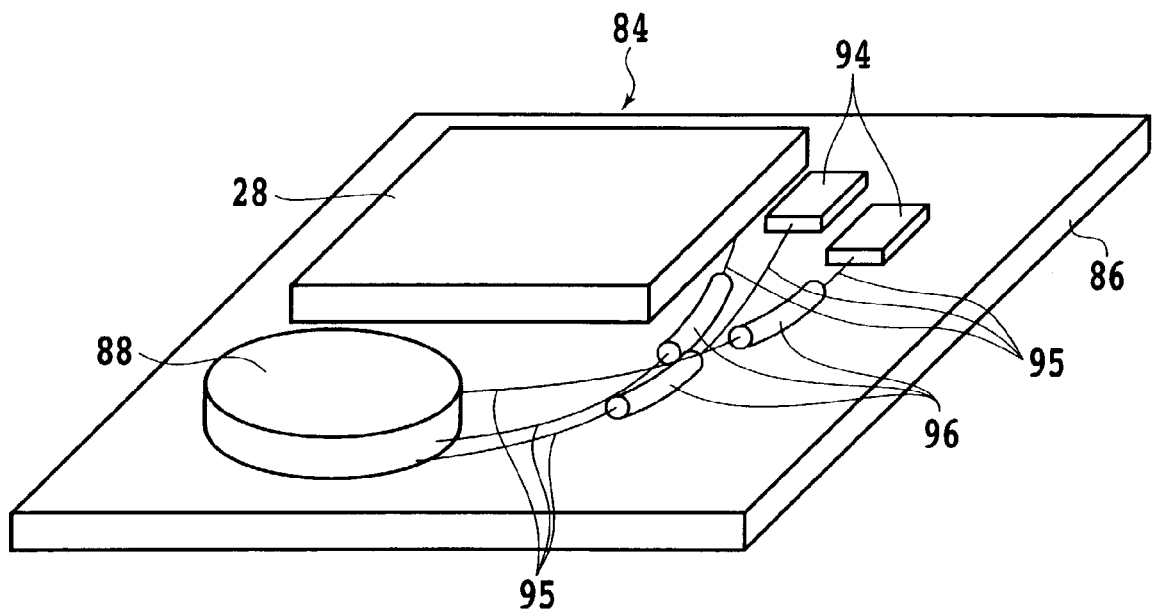
FIG. 10 is a perspective view of an optical amplifier module as a first preferred embodiment of the optical amplifier module according to the present invention.
Figure 11:
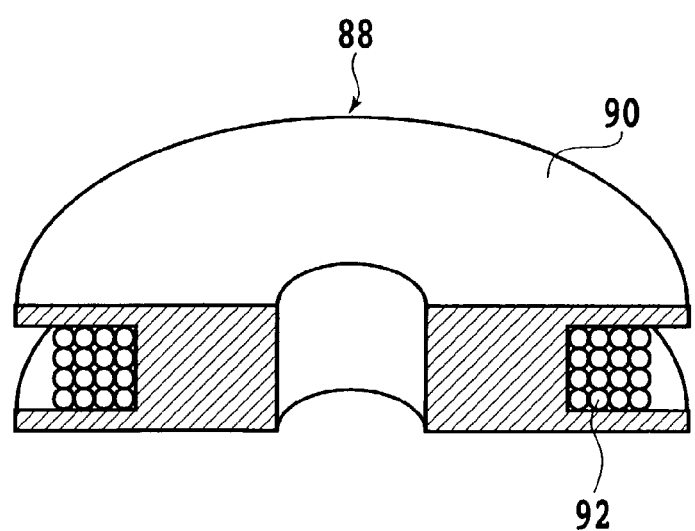
FIG. 11 is a partially cutaway, perspective view of an EDF module in the optical amplifier module shown in FIG. 10.

FIG. 10 shows a schematic perspective view of an optical amplifier module 84 as a first preferred embodiment of the optical amplifier module according to the present invention. The optical amplifier module 84 includes the optical circuit assembly 28 shown in FIG. 4. The optical circuit assembly 28, pumping laser diodes 94, and an Er doped optical fiber module 88 are mounted on a radiating plate 86 formed of aluminum. Optical fibers 95 extending from the optical circuit assembly 28, the pumping laser diodes 94, and the Er doped optical fiber module 88 are spliced, and spliced portions of the optical fibers 95 are protected by protective sleeves 96. As shown in FIG. 11, the Er doped optical fiber module (EDF module) 88 is configured by winding an Er doped optical fiber 92 around a reel 90.

The optical circuit assembly 28 includes various optical components except the pumping laser diodes 94 each required to have a radiation structure and the EDF module 88 required to be different in characteristics according to optical amplifier characteristics. Examples of the optical components included in the optical circuit assembly 28 include a beam splitter, multiplexer/demultiplexer, optical isolator, photodiode, variable attenuator, and gain equalizer. Such a design of the circuit configuration allows a common use of the optical circuit assembly 28.

Figure 12:
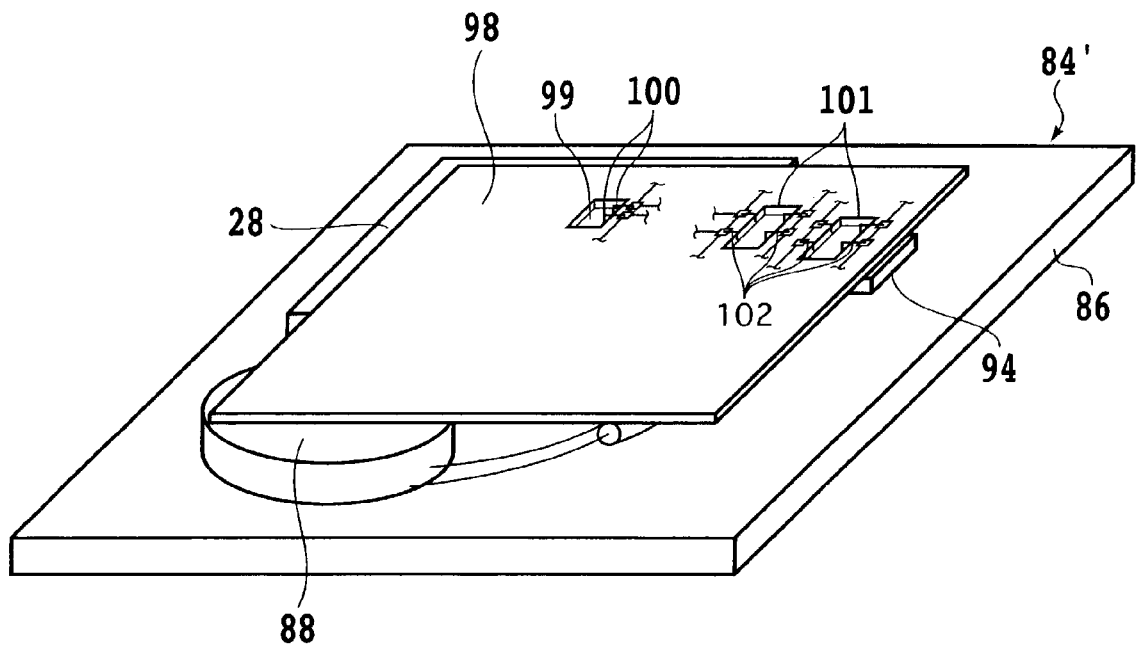
FIG. 12 is a perspective view of an optical amplifier module as a second preferred embodiment of the optical amplifier module according to the present invention.

FIG. 12 shows a schematic perspective view of an optical amplifier module 84' as a second preferred embodiment of the optical amplifier module according to the present invention. The optical amplifier module 84' is different from the optical amplifier module 84 shown in FIG. 10 in that a controlling printed wiring board or printed circuit board 98 is mounted on the optical circuit assembly 28, the pumping laser diodes 94, and the EDF module 88. The controlling printed wiring board 98 has openings 99 and 101. Terminals 100 of the photodiode 50 included in the optical circuit assembly 28 project from the opening 99 and are respectively connected to conductive pads formed on the printed wiring board 98. Similarly, terminals 102 of the pumping laser diodes 94 project from the openings 101 and are respectively connected to conductive pads formed on the printed wiring board 98. The printed wiring board 98 is a multilayer printed wiring board, wherein electronic components such as an LSI (not shown) are mounted on the upper surface, and conductor patterns are formed on the inner layers.

The present invention can exhibit the following meritorious effects.

(a) The space for forming of the optical fibers can be enlarged, and the workability to forming of the optical fibers can be greatly improved because of no use of any fixtures hindering the forming operation.

(b) Since the upper surface of the cushion sheet has tackiness, the optical fibers can be temporarily fixed at arbitrary positions on the upper surface of the cushion sheet, thereby facilitating the forming operation of the optical fibers.

(c) The optical components, the optical fibers, and the fiber spliced portions can be simultaneously fixed to thereby improve the efficiency of the fixing operation.

(d) The optical components are positioned by simply inserting them into the respective recesses of the lower substrate, and they are fixed by laying the upper substrate on the lower substrate. Accordingly, no screws for fixing the optical components are required.

(e) The optical components and the optical fibers are fixedly sandwiched between the cushion sheet attached to the lower substrate and the cushion sheet attached to the upper substrate. Accordingly, the optical fibers can be fixed with less stress to thereby suppress loss of the optical fibers.

(f) Since the optical fiber wiring patterns are printed in different colors on the lower substrate, the forming operation of the optical fibers can be simply performed without the need for any specific mounting charts.

What is claimed is:

1. An optical circuit assembly comprising:
    a first substrate having a plurality of first recesses;
    a plurality of optical components mounted in said first recesses of said first substrate, respectively;
    a first transparent cushion sheet provided on said first substrate, said first cushion sheet having a plurality of openings at positions respectively corresponding to the positions of said first recesses;
    a plurality of optical fibers connected to said optical components and arranged on said first cushion sheet;
    a second substrate having a plurality of second recesses at positions respectively corresponding to the positions of said first recesses;
    a second cushion sheet provided on said second substrate so as to cover said second recesses; and
    means for fixing said second substrate to said first substrate so that said first and second cushion sheets come into contact with each other;
    wherein said first substrate has printed wiring patterns along which said optical fibers are formed.

2. An optical circuit assembly according to claim 1, further comprising a tack coating formed on the upper surface of said first cushion sheet where said optical fibers are arranged.

3. An optical circuit assembly according to claim 1, wherein said first cushion sheet is formed of a material having tackiness.

4. An optical circuit assembly according to claim 1, further comprising a plurality of stress adjusting projections fixed to said first substrate.

5. An optical circuit assembly according to claim 1, wherein:
    each of said first recesses of said first substrate has a depth enough to fully receive each of said optical components; and
    said first substrate has a plurality of guide grooves for guiding said optical fibers to the upper surface of said first cushion sheet with a given radius of curvature or more.

6. An optical circuit assembly according to claim 1, wherein:
    said optical fibers have at least one spliced portion at which said optical fibers are spliced with each other;
    said spliced portion being protected by a protective sleeve.

7. A substrate assembly comprising:
    a substrate having a plurality of recesses having shapes respectively corresponding to the shapes of optical components to be mounted, and printed wiring patterns along which optical fibers are to be formed; and
    a transparent cushion sheet attached to the upper surface of said substrate, said cushion sheet having a plurality of openings at positions respectively corresponding to the positions of said recesses.

8. A substrate assembly according to claim 7, further comprising a tack coating formed on the upper surface of said cushion sheet.

9. A substrate assembly according to claim 7, wherein said cushion sheet is formed of a material having tackiness.

10. A substrate assembly according to claim 7, further comprising a plurality of projections fixed to the upper surface of said substrate.

11. An optical amplifier module comprising:
    a radiating plate;
    a pumping laser diode mounted on said radiating plate;
    an Er doped optical fiber module mounted on said radiating plate and connected to said pumping laser diode, said Er doped optical fiber module having a reel and an Er doped optical fiber wound around said reel; and
    an optical circuit assembly mounted on said radiating plate and connected to said Er doped optical fiber module;
    said optical circuit assembly comprising:
        a first substrate having a plurality of first recesses;
        a plurality of optical components mounted in said first recesses of said first substrate, respectively;
        a first cushion sheet provided on said first substrate, said first cushion sheet having a plurality of openings at positions respectively corresponding to the positions of said first recesses;
        a plurality of optical fibers connected to said optical components and arranged on said first cushion sheet;
        a second substrate having a plurality of second recesses at positions respectively corresponding to the positions of said first recesses;
        a second cushion sheet provided on said second substrate so as to cover said second recesses; and
    means for fixing said second substrate to said first substrate so that said first and second cushion sheets come into contact with each other.

12. An optical amplifier module according to claim 11, further comprising a controlling printed wiring board mounted on said pumping laser diode, said Er doped optical fiber module, and said optical circuit assembly, said controlling printed wiring board having a plurality of openings;
    said optical circuit assembly having a photodiode as one of said optical components;

said photodiode and said pumping laser diode respectively having terminals projecting from said openings of said controlling printed wiring board;

said terminals of said photodiode and said pumping laser diode being connected to conductive pads formed on said controlling printed wiring board.

13. An optical circuit assembly comprising:

a first member;

a second member facing to said first member;

an optical device disposed in a first space formed between first opposing surfaces of said first and second members; and an optical fiber connected to said optical device, said optical fiber being disposed in a second space formed between second opposing surfaces of said first and second members, said second space being shallower in depth than said first space.

14. An optical circuit assembly according to claim 13, wherein a part of said optical fiber is projected out of said first and second members.

15. An optical circuit assembly comprising:

a first member having printed wiring patterns along which optical fibers are to be formed, said printed wiring patterns being viewable from a first surface side;

optical fibers arranged along said printed wiring patterns;

a second member disposed opposite to said first surface of said first member; and an optical device disposed in a space formed between opposing surfaces of said first and second members, wherein said first surface of said first member is formed by a transparent cushion sheet.

16. An optical circuit assembly comprising:

a first member;

a second member facing to said first member;

an optical device disposed in a space between opposing surfaces of said first and second members; and a plurality of stress adjusting projections provided between said first and second members.

* * * * *

UNITED STATES PATENT AND TRADEMARK OFFICE
CERTIFICATE OF CORRECTION

PATENT NO. : 7,043,105 B2  Page 1 of 1
APPLICATION NO. : 10/273090
DATED : May 9, 2006
INVENTOR(S) : Tadao Arima It is certified that error appears in the above-identified patent and that said Letters Patent is hereby corrected as shown below:

On the cover page, column 2, (Primary Examiner), line 1, change "Daniel Stcyr" to --Daniel St. Cyr--

Signed and Sealed this

Seventeenth Day of October, 2006

JON W. DUDAS
*Director of the United States Patent and Trademark Office*